May 12, 1964 A. EPSTEIN ET AL 3,132,488
THERMOELECTRICITY
Filed Dec. 7, 1959
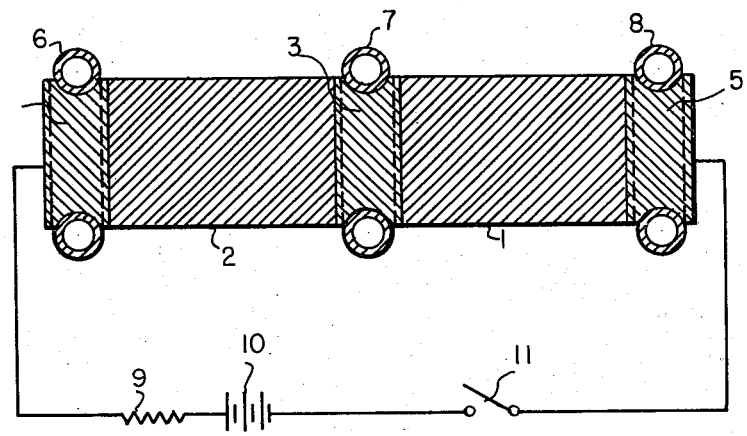
INVENTORS
ARNOLD EPSTEIN
STANLEY M. KULIFAY
BY Herman O. Bauermeister
ATTORNEY 3,132,488
THERMOELECTRICITY
Arnold Epstein and Stanley M. Kulifay, Dayton, Ohio, assignors to Monsanto Chemical Company, St. Louis, Mo., a corporation of Delaware
Filed Dec. 7, 1959, Ser. No. 857,891
7 Claims. (Cl. 62—3)

The present invention relates to thermoelectric compositions which are of utility for the direct conversion of electricity in either cooling or heating processes, and also the generation of electricity by the application of heat to the novel bodies of the present invention. The present invention relates to methods of manufacturing the said bodies of the novel thermoelectric composition as articles of manufacture. The invention also relates to the use of the said bodies in devices such as thermocouples, thermistors, radiation detectors, pyrometers, and thermorelays.

The thermoelectric materials contemplated in the present invention are consolidated forms of finely-divided particles of a composition of silver, copper, tellurium and selenium. The consolidation of the discrete particles is effected by various pressing operations. The particles of the powder are obtained by chemical coprecipitation or from a fused, e.g., densiform solid by grinding, comminution or abrasion. Such mechanical subdivision to obtain the powder is carried out with a pressed or unpressed solid-state reaction mixture of the individual component elements, or a mixture of powders.

The major component of the product is silver; the copper and tellurium must be present to the extent of at least 0.005% by weight while the selenium is the component added to bring the formulations into the range defined below. Sulfur is an optional component, and when present is preferably employed in the range of 0 to 8% by weight. Various chemical compounds and also non-stoichiometric forms may thus exist in the product. The broad range of compositions, in percent by weight, is:

| | Percent |
|---|---|
| Silver | 70 to 85 |
| Copper | 0.005 to 2 |
| Tellurium | 0.005 to 1 |
| Selenium | 4.000 to 29.99 |

Specific preferred compositions are given below in percentage by weight:

| | I | II | III |
|---|---|---|---|
| Copper | 1.000 | 1.080 | 1.000 |
| Silver | 78.000 | 84.230 | 78.000 |
| Tellurium | 0.924 | 0.650 | 0.600 |
| Selenium | 20.076 | 14.040 | 13.000 |
| Sulfur | 0.000 | 0.000 | 7.400 |

The said compounds are used in both stoichiometric and non-stoichiometric form, and also modified or doped by the addition thereto of an agent selected from the group consisting of sulfur, silver, selenium, tellurium, copper, nickel, mercury, lead, cadmium, bismuth, antimony, thallium, gold, and manganese. The proportion of the doping additive including the use of one binary or higher chemical composition added to the above basic material as the dopant or additive is broadly in the range of less than 15% by weight, or preferably from 0.005 to 15% by weight. A still more preferred range, particularly in the case of single elements as the additive is from 0.01% to 10% by weight relative to the weight of the base material.

The present invention is carried out employing discrete particles of the desired composition as the starting material. Such finely-divided or powdered materials are obtained by various methods, such as by mechanical abrasion and dispersion methods, e.g. grinding and pulverizing, or by chemical precipitation methods such as by precipitation or coprecipitation of the finely-divided binary and higher compositions from solutions of the desired components precipitated by hydrazine and other precipitating agents.

The size of the particles can be varied over a wide range and it has been found that exceedingly finely-divided particles are effective in the present relationship. It is preferred that the particles be of less than 2,500 micron diameter. However, very finely-divided particles such as 50 micron particles and even smaller for example 10 micron diameter particles have been found to operate very efficiently in the present method. A still more preferred particle size range is from 0.01 to 1,000 microns.

The formation of thermoelectric bodies in accordance with the present invention is carried out by consolidating the discrete particles by subjecting them to a pressure of at least 500 pounds per square inch, or preferably at least 1,000 pounds per square inch. Higher pressures may be used as desired and pressures of the order of 2,500 to 200,000 pounds per square inch have been found useful for this purpose. A suitable temperature range is from a temperature of 30° C. to a temperature of 50° C. below the melting point, while a preferred temperature range is from 50° C. to 600° C. A still more preferred temperature range is from 75° C. to 500° C. The use of higher pressures makes it possible to operate with lower temperatures. It is desirable, though not necessary, to employ a vacuum of $10^{-2}$ to $10^{-3}$ mm. Hg during the heating step.

In the practice of the present invention, heating times of 5 minutes to 24 hours, or preferably, of 15 minutes to 2 hours are effective, in a vacuum of $10^{-2}$ to $10^{-3}$ mm. Hg.

The present process is based upon the consolidation of the individual particles into a shaped mass of superior thermoelectric properties for use in various specific applications. In a preferred embodiment of the invention, this pressed piece is heated as described above to further improve the thermoelectric properties. The pressing and heating may be combined in a so-called "hot pressing" operation in which a heated die is employed to provide both pressure and the desired temperature as a unitary process.

It has been found that the products thus obtained are characterized by an ultimate structure based upon the original particulate form and differ radically from a cast e.g. densiform or melted type of product. Thus in the measurement of the thermoelectric power of the compositions of the present invention, it has been found that far superior results are obtained by the employment of particulate starting materials subjected to elevated pressure and moderate temperatures in contrast to the same materials melted to a liquid state and allowed to solidify such as by casting, extruding and other melt processes.

The mechanism by which modification of the thermoelectric power is obtained by doping has not been completely elucidated. However, it has been found that the range of $10^{14}$ to $10^{17}$ carriers per cc., that is from 0.000001% to 0.001% by weight, of additives or dopants characteristic of typical semi-conductor compositions, e.g., in transistors, and rectifiers and diodes are not effective in the present thermoelectric compositions.

It has been found that when the above basic matrix compositions and the modified derivatives thereof are used in a powdered form, particularly as particles of less than 2,500 microns diameter and preferably in the particle size range of from 0.01 to 1,000 microns diameter, and subjected to a pressing step, the resultant product is improved. Additional heat treatment, or sintering, gives even further improvement. The improvement is shown in the gain of thermoelectric utility over the prior art compositions as revealed by the so-called "figure of merit" Z, defined as the ratio of the Seebeck coefficient or thermoelectric power, S, squared to the product of the electrical resistivity, $\rho$, and thermal conductivity, K.

$$Z = \frac{S^2}{\rho K}$$

(Semiconductor Thermoelements and Thermoelectric Cooling, p. 1, A. F. Ioffe, Infosearch Limited, London, 1957).

Thermoelectric generation—for maximum efficiency
$T_1$—hot temp.
$T_0$—Temp. at cold end $$\eta = \frac{T_1 - T_0}{T_1} \times \frac{\sqrt{\left(\frac{T_1+T_0}{2}\right)Z + 1} - 1}{\sqrt{\left(\frac{T_1+T_0}{2}\right)Z + 1} + \frac{T_0}{T_1}}$$

Part I, Chap. 2, p. 40, A. F. Ioffe

For thermoelectric cooling the maximum theoretical coefficient of performance, $\epsilon_0$, is related to Z as follows:

$$\epsilon_0 = \frac{T_1}{T_0 - T_1} \times \frac{\sqrt{1 + \frac{(T_0+T_1)Z}{2}} - \frac{T_0}{T_1}}{\sqrt{1 + \frac{1}{2}(T_0+T_1)Z} + 1}$$

$\epsilon_0$ = Coefficient of performance
$T_0$ = the warmer, and
$T_1$ = the cooler junction temperature
Part 2, Chap. I, Ioffe pp. 99, 115

The following examples illustrate specific embodiments of the invention:

EXAMPLE 1

The prior art has recognized that fused (completely melted and re-solidified) complex compositions such as a composition of copper, silver, tellurium, selenium, and sulfur may be used as thermoelectric elements. However, the applicants have found that the present materials in pressed and sintered powder form give greatly superior figures of merit over the prior art compositions. In order to show this effect, compositions were prepared by wet precipitation using ammoniacal hydrazine hydrochloride in aqueous solution mixed with aqueous solutions of compounds of the following elements:

I

| | Percent |
|---|---|
| Copper | 1.000 |
| Silver | 78.000 |
| Tellurium | 0.924 |
| Selenium | 20.076 |
| Sulphur (from thioacetamide) | 0.000 |

In this formulation, I, the percent of copper and of silver were not altered from those given in composition III below. However, the sulfur was omitted and replaced by increases in the tellurium and selenium only, in proportion to the amounts called for in composition III.

EXAMPLE 2

A similar composition without the sulfur but in which all the other components were proportionally increased was also prepared by wet precipitation using ammoniacal hydrazine hydrochloride as the precipitating component with soluble compounds of the first four of the above components being present in an aqueous system. The sulfur-free, non-stoichiometric compound had the following composition:

II

| | Percent |
|---|---|
| Copper | 1.080 |
| Silver | 84.230 |
| Tellurium | 0.650 |
| Selenium | 14.040 |

EXAMPLE 3

A third sample was also prepared, with the following composition:

III

| | Percent |
|---|---|
| Copper | 1.000 |
| Silver | 78.000 |
| Tellurium | 0.600 |
| Selenium | 13.000 |
| Sulfur (from thioacetamide) | 7.400 |

The finely powdered products of compositions I, II, and III were subjected to electrical measurement in the form of pressed, sintered and unsintered powders, i.e., particle diameters of 0.1 to 250 microns (avg. particle size = 10 microns. An earlier worker using composition III in a fused (densiform) state obtained figures of merit of about $1 \times 10^{-3}$. The results for the above three compositions, all of which gave N-type conductivity were as follows:

| | I | | II | | III | |
|---|---|---|---|---|---|---|
| | Unsintered | Sintered | Unsintered | Sintered | Unsintered | Sintered |
| Electrical resistivity (ohm-cm.) | $1.3 \times 10^{-4}$ | $1.34 \times 10^{-4}$ | $6.95 \times 10^{-5}$ | $3.52 \times 10^{-5}$ | $12.6 \times 10^{-2}$ | $12.6 \times 10^{-3}$ |
| Thermoelectric power ($\mu v./deg.$) | 53 | 80 | 38 | 55 | 194 | 233 |
| Thermal conductivity, K (cal./cm. sec. deg.) | $2.01 \times 10^{-3}$ | $2.09 \times 10^{-3}$ | $3.55 \times 10^{-3}$ | $5.50 \times 10^{-3}$ | $7.05 \times 10^{-4}$ | $3.43 \times 10^{-4}$ |
| Conductivity type | N | N | N | N | N | N |
| Figure of merit Z, $\times 10^{-3}$ (temp. = 25° C.) | 2.6 | 5.4 | 1.4 | 4.0 | 0.1 | 3.0 |

NOTE.—All sintering experiments were conducted at 200° C. for 15–30 minutes at a pressure of $10^{-1}$–$10^{-3}$ mm. Hg.

While the exact mechanism of the physical and chemical behavior of the present thermoelectric bodies has not been completely elucidated, it would appear that the product thus obtained differs from conventional densiform thermoelectric materials (such as bismuth telluride) and methods of preparation thereof in the following ways:

(1) The material as prepared in the powder form by the precipitation method lends itself easily to a (crystal) disordering process but yet retains chemical and thermodynamic stability within the framework of utility.

(2) It is usually found that compressed or compacted powders exhibit electrical resistivities which may be much poorer than those found for the same material in the densiform structure, such as by melting and casting. However, the present invention, in compressing and compacting powders, exhibits surprisingly desirable resistivities and other electrical properties (of thermoelectric utility). The present invention makes it possible to achieve an unforeseen improvement in thermal conductivity, K, even though the commonly-used ratio of the thermoelectric power squared to the electrical resistivity ($S^2/\rho$) for the densiform material and compacted powder are comparable. We note this especially in the case of a simple material, e.g., silver selenide where the electrical and thermal properties of (a) a sample which had been melted and then solidified and (b) a compacted powder sample, are compared.

|  | Ag$_2$Se | |
|---|---|---|
|  | Melted and solidified | Pressed powder |
| Electrical resistivity, $\rho$, ohm-cm | 8.5×10$^{-4}$ | 3.75×10$^{-4}$ |
| Seebeck coefficient, S, $\mu$v./deg | 120 | 74 |
| S$^2$/$\rho$ | 1.68×10$^{-5}$ | 1.46×10$^{-5}$ |
| Thermal conductivity, K, cal./cm. sec. deg | 3.12×10$^{-3}$ | 2.19×10$^{-3}$ |
| Conductivity type | N | N |
| Figure of merit, Z temp.=27° C | 1.3×10$^{-3}$ | 1.6×10$^{-3}$ |

The present invention includes doped or modified compositions which are employed in a consolidated form, e.g., pressed, sintered particles, to give superior thermoelectric materials. For example, the above formulation III is distinguishable over compositions I and II by the addition of sulfur as a dopant. The densiform, i.e., fused and solidified form of composition III has been reported to have a figure of merit of about $1\times10^{-3}$. However, when this same composition, III, is produced as a particulate solid of 1 to 250 microns particle size and consolidated by pressing at 20,000 p.s.i. and then sintered at 200° C. for 30 minutes and at 10$^{-3}$ mm. Hg, the figure of merit is $3\times10^{-3}$.

(3) An example of the advantage of doping together with compacting powder may be seen in the high figures of merit that can be obtained in comparison to the melted, densiform, stoichiometric material. The modified material is a pressed, doped (0.1% Se) Ag$_2$Se which is subjected to (a) pressing without sintering, and (b) pressing with sintering in vacuum of 10$^{-2}$ to 10$^{-3}$ mm. Hg. (Sintering can also be done using other conventional methods such as inert gas blanketing under vacuum, atmospheric, or super-atmospheric pressures.)

|  | Stoichiometric densiform (melted and solidified) | Ag$_2$Se+0.1% Se (pressed) | |
|---|---|---|---|
|  |  | Unsintered | Sintered at 200° C. for total time of 1 hour (press 10$^{-2}$–10$^{-3}$ mm. Hg) |
| $\rho$(ohm-cm.) | 8.5×10$^{-4}$ | 6.32×10$^{-4}$ | 7.7×10$^{-4}$ |
| S ($\mu$v./deg.) | 120 | 74 | 117 |
| K (cal./cm.) | 3.12×10$^{-3}$ | 2.16×10$^{-3}$ | 7.58×10$^{-4}$ |
| Conductivity type | N | N | N |
| Z | 1.3×10$^{-3}$ | 1.0×10$^{-3}$ | 5.6×10$^{-3}$ |

Note.—Above properties measured at 27° C.

An example in which high figures of merit can be obtained without sintering is Ag$_2$Se+0.1% copper. The pertinent electrical and thermal properties are reviewed below. The figure of merit calculated from the experimental data was $>8\times10^{-3}$ at room temperature.

Ag$_2$Se+0.1% Cu:
  $\rho$ (ohm-cm.) _____ 1.46×10$^{-4}$
  S ($\mu$v./deg.) _____ 76
  K (cal./cm. sec. deg.) _____ 1.17×10$^{-3}$
  Conductivity type _____ N
  Z _____ 8.1×10$^{-3}$ (4) It will be noted that the above is a doped material. The attainment of the high figure of merit has been found to be a consequence of the addition of a dopant which may create a certain disordering quality in the material or a gradient (variation of concentration of dopant from one end of sample to other) such that the particular electrical and thermal properties are found, with the aid of sintering, generally, to improve and give rise to particularly desirable thermoelectric features.

|  | Ag$_2$Se | Ag$_2$Se+ 0.01% Se | Ag$_2$Se+ 0.1% Se |
|---|---|---|---|
| Electrical resistivity ($\Omega$-cm.) | 6.8×10$^{-4}$ | 6.68×10$^{-4}$ | 7.45×10$^{-4}$ |
| S ($\mu$v./deg.) | 95 | 115 | 117 |
| K (cal./cm. sec. deg.) | 1.49×10$^{-3}$ | 1.39×10$^{-3}$ | 1.24×10$^{-3}$ |
| Conductivity type | N | N | N |
| Z | 2.1×10$^{-3}$ | 3.4×10$^{-3}$ | 3.5×10$^{-3}$ |

Note.—Temperature=27° C.

The advantages of the present material combining preparation and processing are that they (1) permit the attainment of electrical or thermal properties either comparable or superior to those obtained by fusion techniques, such as by melting and casting, (2) yield resultant improved figures of merit, (3) permit preparation and fabrication of material, etc., at considerably lower temperatures than possible by known melting techniques, and (4) introduce a method of controlling thermal conductivity almost independently of electrical resistivity.

In order to obtain the finely divided particles of the present compositions as well as the mixtures and additive-modified compositions described above, a preferred method is chemical coprecipitation. For example, if it is desired to prepare composition II, solutions of the pre-mixed requisite amounts of a silver salt, a copper salt, a selenium compound such as selenous acid, and a tellurium compound may be precipitated from an aqueous solution. In the same way, an excess of any component may be employed; for example, 0.1% by weight excess of silver which is intimately admixed by coprecipitation with the base composition as a finely divided powder. In the same way, the addition of mercury in the base composition may be carried out by precipitating the desired proportions of mercury and silver salts, a copper compound and a selenium and tellurium source. This method is also applicable to the addition of bismuth as an additive in combination with the compositions, as described below, and with other elemental materials described as doping additives. In the final consolidated particulate compositions various proportions of dopants may be dissolved in the space lattice of the base composition or may be concentrated at the grain boundaries of the ultimate consolidated product obtained by the application of pressure and heat as described above. However, the applicants are not bound by this mechanism or the other mechanisms described herein since other physical combinations may also exist in this system.

EXAMPLE 4

The preparation of composition I, above, was carried out as follows:

One-quarter gm. copper and 19.5000 gm. silver were dissolved together in 75 ml. 1:1 nitric acid. In a separate container, 0.2310 gm. tellurium was dissolved in 17 ml. 1:1 Aqua Regia. In a third container 5.0190 gm. selenium was dissolved in 40 ml. 2:1 nitric acid (2 volumes nitric acid and 1 volume water). Now 100 ml. ammonium hydroxide was added to the Cu-Ag solution, and 50 ml. ammonium hydroxide to each of the Te and Se solutions. All three solutions were well mixed with thorough rinsing to form a clear solution.

The reducing solution was made by mixing 500 ml. 10% aqueous hydrazine dihydrochloride, 500 ml. water, and 250 ml. ammonium hydroxide. This was heated to boiling, and the mixed metals solution above added thereto with constant swirling, precipitating the black product. This was boiled for 90 minutes, allowed to settle, and the heavy product thoroughly washed by decantation with water and finally methanol. It was dried under vacuum at 70° C.

EXAMPLE 5

The preparation of composition II described above was carried out as follows. A weight of 0.2702 gm. copper and 21.0567 gm. silver were dissolved together in 80 ml. 1:1 nitric acid. In a separate container 0.1621 gm. tellurium was dissolved in 17 ml. 1:1 Aqua Regia. In a third container was dissolved 3.5110 gm. selenium in 40 ml. 2:1 nitric acid. Now 100 ml. ammonium hydroxide was added to the silver-copper solution, with 50 ml. being also added to each of the tellurium and selenium solutions. All three solutions were thoroughly mixed.

The rest of the procedure as to precipitation was the same as for Example 4.

EXAMPLE 6

The preparation of composition III, above, was carried out as follows:

A weight of 0.2500 gm. copper and 19.5000 gm. silver were dissolved together in 80 ml. 1:1 nitric acid. In separate containers were dissolved 3.2500 gm. selenium in 40 ml. 2:1 nitric acid, and 0.1500 gm. tellurium in 17 ml. 1:1 Aqua Regia. Now 100 ml. ammonium hydroxide was added to the Cu-Ag solution, with 50 ml. being added to each of the Te and Se solutions. The three solutions were thoroughly mixed.

The reducing solution was made as described in Examples I and II with the addition, however, of 4.38 gm. thioacetamide of 98.8% assay, to provide a source of sulfur as sulfide ion upon heating. The mixed metals solution was added to this boiling reducing solution as previously described.

The rest of the procedure was as described for Example 4.

The drawing of the present patent application shows a specific embodiment of the invention as a thermoelectric device. The apparatus shown in the present drawing may be used for the production of cold or heated atmospheres by the application of a direct current. Various compositions contemplated within the present invention may be either N-type or P-type.

Referring to the drawing, the thermoelectric device shown is composed of two thermoelectrically different members 1 and 2 which are conductively joined by an intermediate conductive part 3 of negligible thermoelectric power. The N-type thermoelectric member 2 consists of one of the above-described consolidated particulate compositions. The P-type composition is bismuth telluride. Other thermoelectrically active P-type compositions may also be used in this relationship. While it is desirable to use the present consolidated particulate forms of materials for both the P-type and N-type members, thermoelectric couples may also be formed in which one of the members is of the conventional densiform type, but the second member is a thermoelectric material of the above-described invention based upon the use of finely divided materials subjected to pressure-consolidation.

The member 2 consists of an N-type thermoelectric material, according to the invention. This material may be an alloy or compound such as bismuth telluride, $Bi_2Te_3$, with the use of an additive component such as a sulfide or selenide.

The intermediate part 3 which separates the members 1 and 2 to form a thermoelectric junction between them, consists preferably of a good conductor such as copper. This material serves as a cooling terminal to cool a space, or for the removal of heat from a medium and may be contacted by a pipe coil 7 to conduct a fluid coolant to a distant location.

As used herein, the term "space" includes not only a gaseous or fluid volume but also solid objects and devices. An example of a gaseous space is that in a household refrigerator, while a device is a transistor or an infra-red detector.

Alternatively, the member 3 may be shaped as a thin vane or other structure for cooling in its immediate environment or space, such as cooling such specific area or volume as a commercial or household type of refrigerator. An energizing circuit comprising a direct current source 10, a resistor 9, and a control switch 11 is connected to the element by copper end terminals 4 and 5. The end terminals are provided with single turn pipe coils 6 and 8 through which a heat transporting fluid may be pumped to maintain them at a relatively constant temperature. Thus, when the action of the current through the thermoelectric junction produces a temperature differential between the intermediate terminal 3 and the end terminals 4 and 5, the end terminals may be maintained at a constant temperature and the intermediate one may be reduced or increased in temperature.

EXAMPLE 7

In an arrangement as shown in the drawing of this patent application, the element 2 is respectively consolidated, particulate, sintered composition II (84.23% Ag, 1.08% Cu, 0.65% Te, 14.04% Se, and 0% S) which has a merit factor, $Z=4\times10^{-3}$. Element 1 is bismuth telluride, $Bi_2Te_3$, which has a merit factor, $Z=2.2\times10^{-3}$. It is found that the maximum temperature differential available, with zero heat input to the cold junction is 95° C.

The above results are obtained with an ambient temperature of 25° C., and a current input of 55 amperes.

When the above couple is used for thermoelectric heating, with the reference junction at 0° C., the temperature differential is about 90° C.

EXAMPLE 8

In the above assembly shown in the drawing; e.g., element 2 is consolidated, particulate, sintered composition III (78 wt. percent Ag, 1% Cu, 0.6% Te, 13% Se and 7.4% S), $Z=3\times10^{-3}$ and element 1 is bismuth telluride, $Bi_2Te_3$, $Z=2.2\times10^{-3}$. When this thermocouple pair is used as a device for thermoelectric power generation, it is found that the maintenance of a temperature of 100° C. on element 3 and 0° C. on elements 4 and 5 gives a maximum power output of approximately 0.2 watts, e.g., 5 amperes at 43 millivolts.

As a further example of the advantages of the present procedure utilizing finely divided powders, pressing, and sintering on the figure of merit, experiments were carried out using $Ag_2Se+.75\%$ Se in (a) powder form (b) densiform state (c) repowdered from densiform, in both the original state and in the sintered state. These are denoted in the table below in columns A to F. It will be noted that quite unexpectedly the finely-divided powders pressed but unsintered (A) and the repowdered (finely-divided) and repressed (but unsintered) fused (densiform) material (D) both show about the same figure of merit (Z) at room temperature ($T=25°$ C.) as one finds for the fused or melted $Ag_2Se+0.75\%$ Se. The figure of merit found was $1.3\times10^{-3}$. Normally one would expect the powdered material to be vastly inferior. Further, on sintering at 200° C., it is noted that the pressed powders (B, F) show much higher values of figure of merit than is found for the fused material (C, E). In the case of the material which was repowdered (finely divided) and repressed from the fused (densiform) $Ag_2Se+0.75\%$ Se and then sintered, the improvement is quite marked.

It is noted that heat-treating the fused material itself at 200° C. for 15 minutes shows an improvement in figure of merit also. The merit figure increased from a value of $1.3\times10^{-3}$ to $1.5\times10^{-3}$ (D, E).

Several unexpected effects then may be noted from these experiments: (1) finely divided powders (of $Ag_2Se+0.75\%$ Se) when pressed show about the same figure of merit at $T=25°$ C. as found for fused densiform materials which are normally regarded as showing superior properties; (2) sintering under proper conditions can improve the figure of merit of pressed powders measureably over that found for fused (densiform) materials; (3) by powdering fused materials and sintering, radical improvements in figure of merit can result over that found for fused materials; (4) properly heat-treating fused materials can improve the figure of merit of fused materials.

Table

| | Ag²Se=0.75% Se | | | | | |
|---|---|---|---|---|---|---|
| | A | B | C | D | E | F |
| | Powder pressed but unsintered | Powder pressed, sintered (200° C. for 30 min.) | Fused (melted) (densiform) | Fused material repowdered, repressed but unsintered | Fused (but not repowdered) and sintered (heat treated at 200° C. for 15 min.) | Fused, repowdered, repressed and sintered (200° C. for 15 min.) |
| Resistivity, $\rho$ (ohm-cm.) | $5.98 \times 10^{-4}$ | $9.5 \times 10^{-4}$ | $5.02 \times 10^{-4}$ | $5.33 \times 10^{-4}$ | $5.90 \times 10^{-4}$ | $8.9 \times 10^{-4}$ |
| Thermoelectric power, S (microvolts/deg.) | 80 | 123 | 108 | 75 | 107 | 179 |
| Thermal conductivity, K (cal./cm. sec. deg.) | $1.88 \times 10^{-3}$ | $1.64 \times 10^{-3}$ | $4.22 \times 10^{-3}$ | $1.88 \times 10^{-3}$ | $3.09 \times 10^{-3}$ | $1.41 \times 10^{-3}$ |
| Conductivity type | N | N | N | N | N | N |
| Z, Figure of merit (T.$\times$25° C.) | $1.4 \times 10^{-3}$ | $2.3 \times 10^{-3}$ | $1.3 \times 10^{-3}$ | $1.3 \times 10^{-3}$ | $1.5 \times 10^{-3}$ | $6.1 \times 10^{-3}$ |

What is claimed is:

1. A thermoelectric material having the composition silver 70 to 85%, copper 0.005 to 2%, tellurium 0.005 to 1%, and selenium 4.000 to 29.99%, the said material in particulate form having been pressed at a pressure of at least 1000 p.s.i. and heated at a temperature between 50° C. and 60° C.

2. A thermoelectric material having the composition copper 1.000%, silver 78.000%, tellurium 0.924% and selenium 20.076%, the said material in particulate form having been pressed at a pressure of at least 1000 p.s.i. and heated at a temperature between 75° C. to 500° C.

3. A thermoelectric material having the composition copper 1.080%, silver 84.230%, tellurium 0.650%, selenium 14.040%, the said material in particulate form having been pressed at a pressure of at least 1000 p.s.i. and heated at a temperature between 75° C. to 500° C.

4. A thermoelectric material having the composition copper 1.000%, silver 78.000%, tellurium 0.600%, selenium 13.000%, and sulfur 7.400%, the said material in particulate form having been pressed at a pressure of at least 1000 p.s.i. and heated at a temperature between 75° C. to 500° C.

5. A thermoelectric material having the composition silver 70 to 85%, copper 0.005 to 2%, tellurium 0.005 to 1%, and selenium 4.000 to 29.99% with the addition of a member of the class consisting of sulfur, silver, selenium, tellurium, copper, nickel, mercury, lead, cadmium, bismuth, antimony, thallium, gold, and manganese, the said material in particulate form having been pressed at a pressure of at least 1000 p.s.i. and heated at a temperature between 50° C. and 600° C.

6. A process of cooling which comprises applying a direct current to a body which is composed of the composition silver 70 to 85%, copper 0.005 to 2%, tellurium 0.005 to 1%, and selenium 4.000 to 29.99%, which body has been pressed at a pressure of from 500 to 200,000 pounds per square inch from a powder form existing as particles of from 0.01 to 1,000 microns, and the said pressed material sintered at a temperature between 75° C. and 500° C. for a time of from 15 minutes to 2 hours.

7. Process for the manufacture of a thermoelectric body which comprises consolidating a mass of finely-divided particles having the composition silver 70 to 85%, copper 0.005 to 2%, tellurium 0.005 to 1%, and selenium 4.000 to 29.99% by applying thereto a pressure of at least 500 pounds per square inch, and maintaining the said consolidated mass at a temperature of from 30° C. to a temperature which is 50° C. below the melting point.

References Cited in the file of this patent

UNITED STATES PATENTS

| | | |
|---|---|---|
| 2,229,482 | Telkes | Jan. 21, 1941 |
| 2,289,152 | Telkes | July 7, 1942 |
| 2,397,756 | Schwarz | Apr. 2, 1946 |
| 2,597,752 | Salisbury | May 20, 1952 |
| 2,902,528 | Rosi | Sept. 1, 1959 |
| 2,952,980 | Douglas | Sept. 20, 1960 |

FOREIGN PATENTS

| | | |
|---|---|---|
| 836,944 | Germany | Apr. 17, 1952 |